United States Patent
Sloane et al.

3,722,978
Mar. 27, 1973

[54] OPTICAL SCATTERING FILTER WITH HYGROSCOPIC MATERIAL

[75] Inventors: Howard J. Sloane; Gerald T. Keahl, both of Fullerton, Calif.

[73] Assignee: Beckman Instruments, Inc.

[22] Filed: Aug. 30, 1971

[21] Appl. No.: 176,232

Related U.S. Application Data

[63] Continuation of Ser. No. 348,444, March 2, 1964, abandoned.

[52] U.S. Cl. ..........................350/1, 250/86, 350/316
[51] Int. Cl. ................................................G02b 5/22
[58] Field of Search..........350/1, 311, 164, 165, 316; 250/86; 55/16, 158; 210/500, 23, 22, 321

[56] References Cited

UNITED STATES PATENTS

| | | | |
|---|---|---|---|
| 3,228,292 | 1/1966 | Carlon et al. | 350/1 |
| 3,279,938 | 10/1966 | Schneeberger | 350/1 X |

OTHER PUBLICATIONS

Carlon: A. R. "Durable Narrow Absorption Band Infrared Filters Utilizing Powdered Mineral Materials on Polyethylene Substrates"; Applied Optics, Vol. 1, No. 5; Sept. 1962, pp. 603–605.

Hunt, Wishered, Botham, "Infrared Absorption Spectra Minerals and Other Inorganic Compounds," Antalytical Chemistry, Vol. 22, No. 12, Dec. 1950, pp. 1478–1479 and 1486–1487.

McCarthy, D. E.; "The Reflection and Transmission of Infrared Materials"; Applied Optics; Vol. 2, No. 6; June, 1963; pp. 591–595

Wolfe, and Ballard, "Optical Materials, Films, and Filters For Infrared Instrumentation"; Proceedings of the Ire, Sept. 1959; Vol. 47, pp. 1540–1546

Yamada, Mitsuishi, and Yoshinaga "Transmission Filters in the Far Infrared Region," Josa, Vol. 52, No. 1, Jan. 1962, pp. 17–19

Blout et al., "Infrared Transmitting Filters, III, The Region 1 to 6 ft," July 1950; 40 JOSA 415–419

*Primary Examiner*—David Schonberg
*Assistant Examiner*—Ronald J. Stern
*Attorney*—P. R. Harder

[57] ABSTRACT

Long pass optical filters for the infrared region and methods of making the same are disclosed which utilize a transmitting matrix of high and low refractive index materials for selectively scattering all wavelengths shorter than a critical wavelength and which have a relatively sharp cut-on front. By the inclusion of materials having absorption bands at wavelengths longer than the cut-on wavelength of the scattering medium, the cut-on front may be sharpened and positioned over a wide range to provide a filter having a preselected cut-on wavelength and cut-on front. The absorbing materials may include one or more hygroscopic materials whose particles tend to coalesce when finely divided. By adding small quantities of a highly refined mineral oil and mulling before die pressing while heating, these materials may be evenly distributed throughout the area of the filter.

11 Claims, 4 Drawing Figures

INVENTORS
HOWARD J. SLOANE
BY GERALD T. KEAHL

Paul R. Harder
ATTORNEY

OPTICAL SCATTERING FILTER WITH HYGROSCOPIC MATERIAL

This is a continuation of application Ser. No. 348,444 filed Mar. 2, 1964, and now abandoned.

This invention relates generally to the selection of radiant energy and more particularly to methods and means capable of selectively transmitting infrared radiation while attenuating all wavelengths shorter than a preselected wavelength and which incorporate hygroscopic compounds.

In the co-pending application of Howard J. Sloane for an Optical Scattering Filter, Ser. No. 176,231, filed Aug. 30, 1971 and assigned to the assignee of the instant invention, which is a continuation of application Ser. No. 348,387, filed Mar. 2, 1964 and now abandoned, there is disclosed in detail and claimed optical filters which produce selective scattering of all wavelengths shorter than some critical wavelength and which utilize various materials having absorption bands at wavelengths longer than this critical wavelength. These filters are particularly useful in the infrared region and have a cut-on front the sharpness of which may be controlled and positioned over a wide range of preselected wavelengths.

The filters therein disclosed utilize uniformly dispersed high index and low index materials to produce selective scattering of all wavelengths shorter than some critical wavelength. By evenly distributing one or more finely divided materials having absorption bands in the infrared region which overlap this critical wavelength the filter may be rendered opaque to all wavelengths shorter than the long wavelength side of those absorption bands.

Certain of the materials having absorption bands in the infrared region, thus finding utility in optical filters, possess hygroscopic properties which cause the finely divided particles to cling or coalesce together thus making the uniform distribution of the material throughout a matrix extremely difficult. Failure to obtain an even distribution of these particles at a given concentration throughout the filter produces an absorption band which is broad and shallow.

It is therefore an object of this invention to provide a method of manufacture of optical filters utilizing materials having hygroscopic properties by which these materials may be finely divided and evenly distributed throughout a matrix.

Another object is to provide optical filters for the infrared region which utilize one or more materials having hygroscopic properties wherein these materials are evenly distributed throughout a matrix.

Other objects and many of the attendant advantages of this invention will become more readily apparent to those skilled in the art as the same becomes better understood by reference to the following detailed description when considered in connection with the attached drawings wherein.

As used herein the term "cut-on front" of a filter means the transmission characteristics of the filter at its shorter wavelength of transmission. The term "cut-on wave-length" is used to mean that wavelength below which transmission of the material or filter is less than 1.0 percent and "cut-on front width" means the difference between the wavelength at which the filter reaches approximately 50 percent transmittance and the cut-on wavelengths in microns. It should be understood that these points have been arbitrarily chosen so that the approximate configuration of the cut-on front may be defined.

Figure 1:
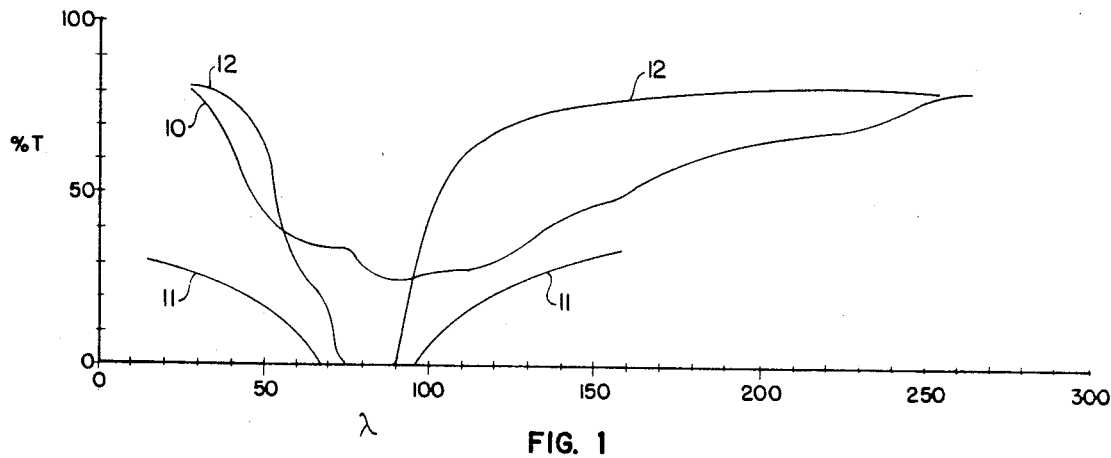
FIG. 1 illustrates the absorption band of certain hygroscopic materials.

Referring now to FIG. 1, curve 10 illustrates the absorption band of KBr in the region of 80 microns which was obtained by dry mixing KBr in polyethylene in sufficient quantity to provide a concentration of 28.5 $mg/in^2$. Specifically, 35 mg of KBr and 300 mg of polyethylene were finely divided and thoroughly mixed. All of the material was placed in a die having a diameter of 1.25 inches, heated to approximately 100° C. and compacted at a pressure of 12,000 p.s.i. to provide a flat disc 1.25 inches in diameter. The material was allowed to cool to approximately 65° C. under pressure before removal from the die.

As illustrated by the curve, the absorption band is centered at approximately 80 microns but transmits approximately 28 percent of the incident energy. Failure of the band to become completely opaque is due to the hygroscopic properties of KBr which cause the finely divided particles to coalesce or cling together thus making the uniform distribution of these particles throughout the matrix extremely difficult.

This band may be made to become completely opaque by increasing the concentration of KBr in the matrix. For example, curve 11 illustrates the optical characteristics of an increased concentration of KBr in the polyethylene matrix. As illustrated, by increasing the concentration, the band broadens and absorbs a substantial amount of radiation throughout the entire region.

A complete dispersion of a hygroscopic material such as KBr may be accomplished by grinding the material to provide finely divided particles while adding small quantities of a highly refined mineral oil. Polyethylene powder is then added with additional small amounts of the oil until a creamy, uniform mixture is obtained. This mixture is placed in a die, heated and pressed at temperatures sufficient to cause fusion of the polyethylene to form a thin flat wafer of any suitable shape. During the process the mineral oil becomes less viscous, flows from the wafer and a portion appears to evaporate. The wafer is then leached with any organic solvent which does not dissolve polyethylene such as, for example, hexane or heptane, to remove the residual oil from the wafer. The wafer is reheated to a temperature below that originally utilized but which is sufficient to soften the polyethylene and repressed to flatten the wafer which may become deformed during the leaching process. This leaching, reheating and pressing process may, if desired, be repeated. By this process the mineral oil prevents the finely divided particles of the hygroscopic materials from coalescing or clinging together thus making the uniform distribution of these particles throughout the matrix possible.

Curve 12 of FIG. 1 illustrates the absorption band of KBr at a concentration of 28.5 mg/in$^2$ in a polyethylene matrix and in which the KBr was completely dispersed throughout the matrix. Although this concentration is the same as that utilized in obtaining curve 10, the absorption band of KBr when completely dispersed is substantially opaque from approximately 75 microns to 89 microns and the sides of the band are quite sharp. This difference in the absorption band of KBr at the same concentration in like matrices is believed due to the more even dispersion of the material throughout the matrix.

Specifically, in making the wafer from which curve 12 was obtained 35 mg of KBr was ground in a mortar with a pestle, while small quantities of Nujol mineral oil, manufactured by Plough, Inc., were added. After the KBr was finely divided, 300 mg of Microthene 620 polyethylene powder manufactured by U.S. Industrial Chemical Co. was added and thoroughly blended with the KBr mineral oil mull while adding small amounts of oil until a creamy, uniform mixture was obtained. This mixture was placed in a die having a diameter of 1.25 inches, heated to 100° C. while pressing at approximately 12,000 p.s.i. The wafer was then cooled under pressure to approximately 65° C., removed from the die and leached with hexane to remove the excess oil from the wafer. During this leaching process the wafer was deformed and was again placed in the die, heated to approximately 80° C., and repressed at a pressure of 12,000 p.s.i. The disc was again leached, reheated and repressed under the same conditions.

Figure 2:
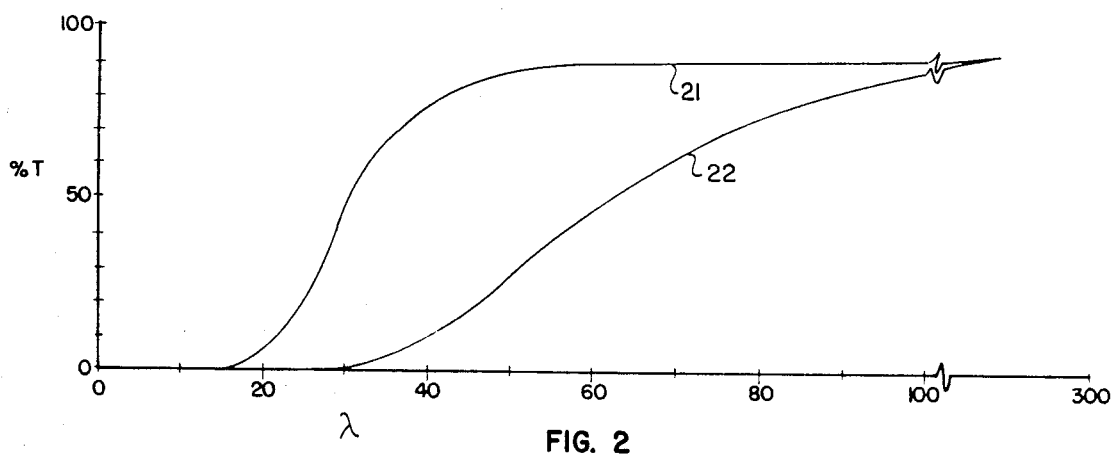
FIG. 2 illustrates the optical characteristic of certain microporous filters.

As disclosed in the aforementioned application, it has been discovered that microporous polyethylene filters which were obtained from the Millipore Filter Corporation, Bedford, Mass., possess highly desirable optical characteristics in the infrared region. Curves 21 and 22 of FIG. 2 illustrate the transmission characteristics of Millipore's Type OH and OS solvent resistant filters respectively. The Type OH solvent resistant filter is a polyethylene matrix which, according to the supplier, has a mean pore size of 1.5 ± 0.5 microns and a thickness of 127 ± 13 microns. The pores are uniformly distributed throughout the filter and vary from approximately 1.0 to 2.0 microns with a mean pore size of 1.5 microns. The pore volume occupies a high percentage of the total volume of the filter.

The Type OS solvent resistant filter has a mean pore size of 10.0 ' 3.0 microns and a thickness of 280 ± 25 microns. In this filter the matrix is likewise of polyethylene with the pores uniformly distributed throughout the matrix. The pore volume occupies a high percentage of the total volume of the filter.

The Type OH or 1.5 micron pore size filter has a cuton wavelength of approximately 15 microns and the Type OS or 10 micron pore size filter has a cut-on wavelength of approximately 26 microns. Each of these filters transmit less than 1.0 percent of all wavelengths shorter than their respective cut-on wavelengths and each reaches approximately 50 percent transmittance at 30 and 62 microns respectively, i.e., each has a cut-on front width of approximately 15 and 36 microns respectively. The Type OH filter has a transmittance of more than 70 percent for all wavelengths longer than approximately 36 microns and the Type OS transmits more than 70 percent of the incident radiation for all wavelengths longer than approximately 76 microns. These filters are particularly useful in the infrared region since polyethylene in thin layers contains no intense absorption band in the region from approximately 14 microns to beyond 300 microns.

The cut-on front of each of these filters is due to the scatter of incident radiation produced by finely divided, evenly distributed low and high refractive index material. In each of these filters the finely divided low refractive index material is air having a refractive index of 1.0 which is evenly distributed throughout the pores of the polyethylene matrix which has a refractive index of approximately 1.5. This finely divided, evenly distributed low refractive index material in a matrix of high refractive index material provides a scattering medium which selectively scatters incident radiation for all wavelengths shorter than the cut-on wavelength while passing wavelengths longer than this critical wavelength.

Figure 3:
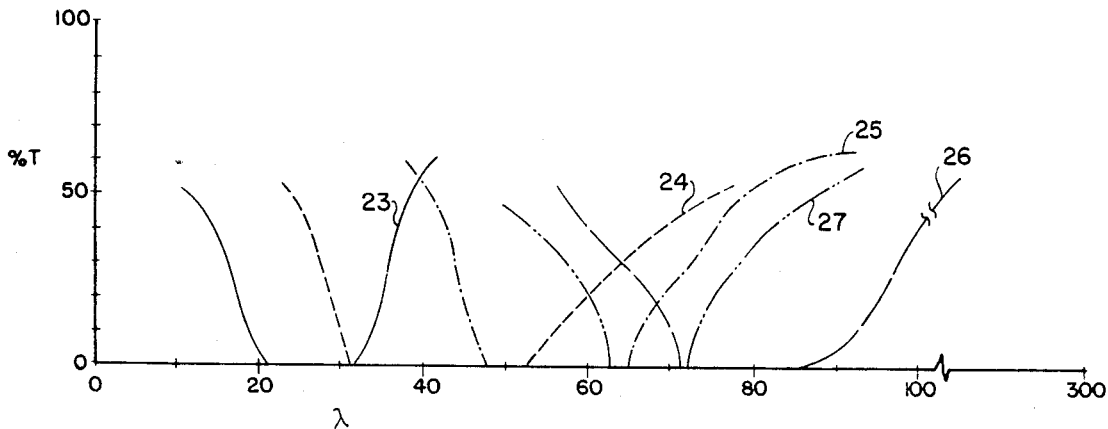
FIG. 3 illustrates the absorption bands of various materials in the infrared region.

By utilizing various materials having absorption bands in the shorter wavelength transmission region of the foregoing scattering media, various filters having differing cut-on wavelengths and cut-on fronts may be constructed. Referring now to FIG. 3 there is illustrated the transmission characteristics of various materials having absorption bands in the short wavelength transmission region of the filters of FIG. 2. Curve 23 represents the absorption band of LiF. Curves 24, 25, 26 and 27 represent, respectively, the absorption bands of $BaF_2$, $BaCO_3$, KBr and $PbCO_3$. It should be noted that the long wavelength side of the LiF band overlaps the short wavelength side of the $BaF_2$ band. Likewise, the short wavelength side of the $BaCO_3$ band overlaps the long wavelength side of the $BaF_2$ band.

By finely dividing appropriate amounts of each of these compounds and uniformly distributing them through a matrix a total absorption band which is substantially opaque from approximately 20 microns to 86 microns is obtained. Inasmuch as the total absorption band produced by these compounds is opaque from approximately 20 microns to 86 microns and the Type OS filter is opaque to radiation of wavelengths shorter than 26 microns, by combining the total absorption band produced by these materials with the scattering medium, a filter may be produced which is substantially opaque to radiation of wavelengths shorter than approximately 86 microns and transmits all longer wavelengths since none of these materials have an absorption band beyond the cut-on wave-length. By omitting KBr and $PbCO_3$ from the foregoing materials an optical filter may be produced which is substantially opaque to all radiation below approximately 65 microns and has a cut-on front substantially commensurate with the long wavelength side of the $BaCO_3$ band. Likewise, by omitting the $BaCO_3$ a filter is produced having a cut-on wavelength of approximately 51 microns and a cut-on front commensurate with the long wavelength side of the $BaF_2$ band. In this manner, various filters which have extremely sharp cut-on fronts that may be varied over a wide range of wavelengths may be produced.

For the preparation of an optical filter in accordance with the foregoing teachings sufficient quantities of KBr, $BaCO_3$ and $BaF_2$ to provide concentrations of approximately 24.4 mg/in$^2$ each and sufficient quantities of PbCO₃ and LiF to provide concentrations of approximately 8.2 mg/in² each were ground in Nujol mineral oil with a mortar and pestal. After the absorbing materials were finely divided, Microthene 620 polyethylene powder was added with additional small amounts of mineral oil and thoroughly blended to obtain a creamy, uniform mixture. The amount of polyethylene is not critical. Too little of the polyethylene provides a matrix which is brittle. A slight excess of polyethylene does not materially affect the performance of the filter except for a slight decrease in energy at the longer wavelengths. However, a large excess results in a significant decrease in energy at the longer wavelengths. It has been found that an amount sufficient to provide approximately 83 percent by weight of polyethylene provides a matrix which, when heated, compresses well and is relatively flexible.

The thoroughly blended mixture is placed in a die, heated to a temperature sufficient to cause the polyethylene to flow and compacted at extremely high pressures to produce a wafer of any desired shape, generally a thin, flat disc. The material is allowed to cool under pressure before removal from the die. During this process the mineral oil becomes less viscous and flows from the disc and a portion appears to evaporate. The disc may then be leached with any organic solvent which does not dissolve polyethylene such as, for example, hexane or heptane, to remove the residual oil from the wafer. The disc is then again placed in the die, reheated to a temperature below that originally used but which is sufficient to soften the polyethylene and repressed to flatten the disc which may become deformed during the leaching process. This leaching, reheating and repressing process may, if desired, be repeated.

As a specific example of the particular filter 300 mg of Microthene 620 polyethylene powder, 10 mg of LiF and PbCO₃, and 30 mg of KBr, BaCO₃ and BaF₂ were prepared according to the foregoing process. All of the material was placed in a die having a diameter of 1.25 inches, heated to 100° C. and compacted at a pressure of 12,000 p.s.i. to produce a flat disc 1.25 inches in diameter. The disc was cooled under pressure to approximately 65° C., removed from the die and leached with hexane to remove the excess oil from the disc. During this process the disc became deformed. The disc was again placed in the die, reheated to 80° C. and repressed at a pressure of 12,000 p.s.i. The disc was again leached, reheated and repressed under the same conditions.

Figure 4:
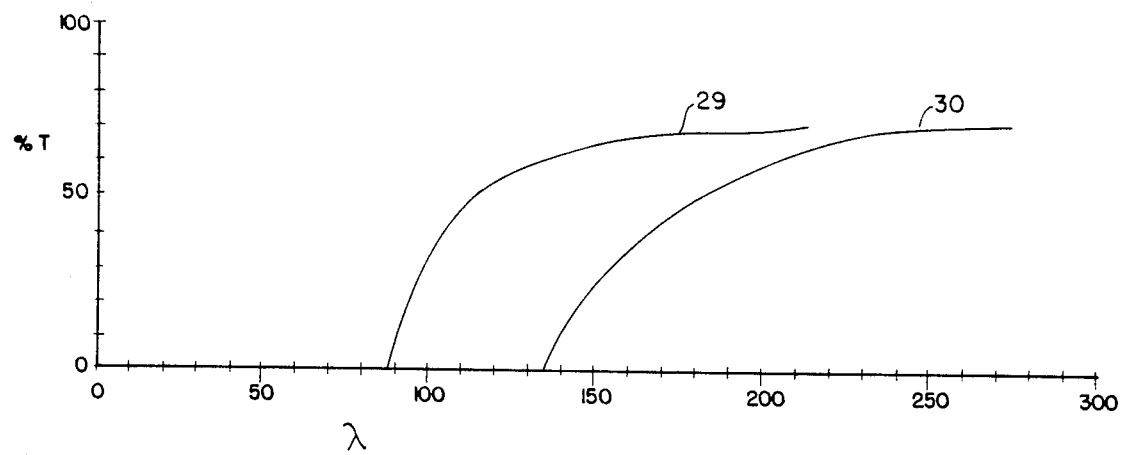
FIG. 4 illustrates the optical characteristic of various filters constructed in accordance with the teachings of this invention.

The disc was secured in series with a Millipore Type OS solvent resistant filter and when subjected to radiation produced the optical characteristic illustrated by curve 29 of FIG. 4. The composite filter has a cut-on front which is commensurate with the long wavelength side of the total absorption band produced by the absorbing materials, i.e., the long wavelength side of KBr. The composite filter transmits more than 70 percent of all incident radiation of wavelengths longer than 200 microns and has a sharp cut-on front. The cut-on wavelength is approximately 86 microns and the cut-on front width is approximately 25 microns. The filter is substantially opaque to all wavelengths shorter than the cut-on wavelength transmitting less than 1.0 percent throughout the shorter wavelength region.

A second example of a filter containing two hygroscopic inorganic compounds, i.e., KBr and CsBr, which was constructed after the teachings of this invention was produced by forming an absorption matrix utilizing the following concentrations of inorganic compounds as absorbing materials: 24.4 mg/in² of KBr; 65.2 mg/in² of CsBr; 24.4 mg/in² of CaCO₃; 24.4 mg/in² of BaCO₃; 8.2 mg/in² of Li₂CO₃; and 24.4 mg/in² of BaF₂.

When prepared in accordance with the foregoing process, utilizing the same temperatures and pressure, and when combined in series with a Millipore Type OS filter, the composite filter has an optical characteristic indicated by curve 30 of FIG. 4.

The composite filter has a cut-on wavelength of approximately 135 microns, a cut-on front width of approximately 44 microns and transmits more than 70 percent of all incident radiation at all wavelengths longer than approximately 250 microns.

It should be understood that although in each of the foregoing examples specific concentrations of the absorbing materials have been given, these concentrations are not in general critical. With the exception of the absorbing material having the absorption band the long wavelength side of which forms the cut-on front of the finished filter, the only critical criteria for the absorption materials is that the concentration is sufficient to render the region below the cut-on wavelength of the composite filter opaque to the desired degree and should not be of such concentration as to materially decrease the transmission at longer wavelengths. As far as the absorbing material having the absorption band which forms the cut-on front of the filter, the cut-on wavelength and the shortness of the cut-on front is a direct function of the concentration of this material and the concentration of this material should be closely controlled if reproducibility from one filter to the next is to be obtained and optimum characteristics of the cut-on front are desired. Therefore, even this absorbing material is not critical except as required by the degree of performance that is desired. It should also be understood that the foregoing teachings are applicable to any hygroscopic or ionic material and are not limited to the specific examples of KBr and CsBr illustrated.

It should further be understood that the cut-on wavelengths and cut-on front widths given throughout this specification and the curves illustrated in the drawings are only exemplary and are produced by one particular filter constructed after the teachings of this invention. It should be appreciated that the cut-on wavelengths and the sharpness of the cut-on front will vary somewhat from filter to filter depending upon the care taken in the weighing of the particular compounds, the procedures followed in forming the filter disc and the calibration of the instrument upon which the spectrum is run. Thus the specific formulations and the curves therefor are given by way of illustration only and not by way of limitation and many modifications and variations of the present invention are possible in light of the foregoing teachings without departing from the spirit and scope of the invention as set forth in the appended claims.

We claim:

1. An optical filter having relatively high transmission to infrared radiation comprising:

a thin transmitting wafer comprising a microporous material producing selective scattering of all wavelengths shorter than a selected wavelength, said wafer having (i) a relatively sharp cut-on front, (ii) being substantially opaque to radiation of wavelengths shorter than said selected wavelengths and (iii) being highly transmissive to radiation of wavelengths longer than said cut-on front; and at least one absorbing material having an absorption band in the shorter wavelength transmission region of said wafer, the particles of said material tending to coalesce when finely divided, said material absorbing at least a portion of the energy transmitted by said wafer and being substantially evenly distributed over an area commensurate with the radiation transmitted thereby.

2. An optical filter having relatively high transmission to infrared radiation comprising:

a thin transmitting wafer comprising a microporous material producing selective scattering of all wavelengths shorter than a selected wavelength; and at least one absorbing material having an absorption band coextensive with the shorter wavelength transmission region of said wafer, the particles of said material tending to coalesce when finely divided, said material absorbing at least a portion of the energy transmitted by said wafer and being substantially evenly distributed over an area commensurate with the radiation transmitted thereby.

3. An optical filter having relatively high transmission to infrared radiation wavelengths longer than a predetermined wavelength comprising the combination of:

a thin transmitting wafer comprising a microporous material producing selective scattering and being substantially opaque to all wavelengths shorter than a first wavelength; and at least one absorbing material having an absorption band that is substantially opaque between a first and second wavelength, said second wavelength being shorter than said first wavelength and said third wavelength being longer than said first wavelength, the particles of said absorbing material tending to coalesce when finely divided, said absorbing material being finely divided and substantially evenly distributed over an area commensurate with the radiation transmitted thereby and positioned to absorb radiation between said first and second wavelength.

4. An optical filter having relatively high transmission to infrared radiation comprising:

a polyethylene matrix having micron size pores of substantially uniform diameter substantially evenly distributed therethrough said matrix being substantially opaque to radiation of wavelengths shorter than a first wavelength and having a relatively sharp cut-on front and being highly transmissive to radiation of wavelengths longer than said cut-on front; and at least one absorbing material having an absorption band coextensive with the shorter wavelength transmission region of said matrix and absorbing at least a portion of the energy transmitted by said matrix, the particles of said absorbing material tending to coalesce when finely divided, said material being finely divided and substantially evenly distributed over an area commensurate with the radiation transmitted thereby.

5. An optical filter having relatively high transmission to infrared radiation comprising the combination of:

a first polyethylene matrix having micron size pores of substantially uniform diameter substantially evenly dispersed therethrough, said matrix (i) being substantially opaque to radiation of wavelengths shorter than a first wavelength, (ii) having a relatively sharp cut-on front and (iii) being highly transmissive to radiation longer than said cut-on front; and at least a second matrix having at least one finely divided material the particles of which tend to coalesce, said finely divided material being substantially evenly distributed therethrough and having an absorption band that is substantially opaque between a first and second wavelength, said second wavelength being shorter than said first wavelength and said third wavelength being longer than said first wavelength, said second matrix having no significant absorption bands in the region from said third wavelength to at least 300 microns.

6. An optical filter having relatively high transmission to infrared radiation comprising:

a polyethylene matrix having micron size pores of substantially uniform diameter substantially evenly dispersed therethrough;

at least a second matrix; and a plurality of absorbing materials the particles of at least one of which tend to coalesce when finely divided, said plurality of absorbing materials having overlapping absorption bands of intensity such that the region between a second wavelength and a third wavelength is substantially opaque, said second wavelength being shorter than said first wavelength and said third wavelength being longer than said first wavelength, each of said plurality of absorbing materials being finely divided and substantially evenly dispersed throughout said second matrix, said second matrix having no significant absorption bands in the region from said third wavelength to at least 300 microns.

7. An optical filter having relatively high transmission to infrared radiation wavelengths longer than a predetermined wavelength comprising the combination of:

a thin transmitting wafer comprising a microporous material producing selective scattering and being substantially opaque to all wave lengths shorter than a first wavelength; and a plurality of absorbing materials having overlapping absorption bands of intensity such that the region between a second wavelength and a third wavelength is substantially opaque, said second wavelength being shorter than said first wavelength and said third wavelength being longer than said first wavelength, the particles of at least one of said absorbing materials tending to coalesce when finely divided, each of said absorbing materials being substantially evenly distributed over an area commensurate with the radiation transmitted thereby and positioned to absorb radiation between said second and third wavelength.

8. An optical filter according to claim 7 wherein: said plurality of absorbing materials include KBr, BaCO$_3$, BaF$_2$, PbCO$_3$ and LiF and said third wavelength is about 86 microns.

9. An optical filter according to claim 8 wherein: said plurality of absorbing materials include approximately 24.4 mg/in$^2$ of KBr, BaCO$_3$ and BaF$_2$ and approximately 8.2 mg/in$^2$ of PbCO$_3$ and LiF.

10. An optical filter according to claim 7 wherein: said plurality of absorbing materials include KBr, CsBr, CaCO$_3$, BaCo$_3$, Li$_2$CO$_3$ and BaF$_2$ and said third wavelength is about 135 microns.

11. An optical filter according to claim 10 wherein: said plurality of absorbing materials include approximately 24.4 mg/in$^2$ of KBr, CaCO$_3$, BaCO$_3$ and BaF$_2$, 65.2 mg/in$^2$ of CsBr and 8.2 mg/in$^2$ of Li$_2$CO$_3$.

* * * * *